United States Patent
Ishi et al.

(10) Patent No.: US 10,987,741 B2
(45) Date of Patent: Apr. 27, 2021

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventors: Hirohisa Ishi, Moriyama (JP); Kazuki Yamamichi, Yasu (JP); Shohei Mao, Yasu (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/634,197

(22) PCT Filed: Jul. 24, 2018

(86) PCT No.: PCT/JP2018/027739
§ 371 (c)(1),
(2) Date: Jan. 27, 2020

(87) PCT Pub. No.: WO2019/022086
PCT Pub. Date: Jan. 31, 2019

(65) Prior Publication Data
US 2020/0171584 A1 Jun. 4, 2020

(30) Foreign Application Priority Data
Jul. 27, 2017 (JP) .............................. JP2017-145719

(51) Int. Cl.
*B23B 27/16* (2006.01)

(52) U.S. Cl.
CPC ... *B23B 27/1611* (2013.01); *B23B 2200/0428* (2013.01)

(58) Field of Classification Search
CPC ... B23C 2200/203; B23C 5/109; B23C 5/207; B23C 5/2213; B23C 5/20
See application file for complete search history.

(56) References Cited

U.S. PATENT DOCUMENTS

| | | | |
|---|---|---|---|
| 2010/0080662 A1 | 4/2010 | Satran et al. | |
| 2012/0009029 A1* | 1/2012 | Saji | B23C 5/207 407/67 |
| 2012/0170987 A1 | 7/2012 | Komatsuka | |
| 2016/0158854 A1* | 6/2016 | Ishi | B23C 5/207 409/131 |

(Continued)

FOREIGN PATENT DOCUMENTS

| | | |
|---|---|---|
| JP | 2007290059 A | 11/2007 |
| JP | 2010523352 A | 7/2010 |

(Continued)

*Primary Examiner* — Nicole N Ramos
(74) *Attorney, Agent, or Firm* — Viering, Jentschura & Partner MBB

(57) ABSTRACT

A cutting insert may include a first surface having a polygonal shape, a second surface, a third surface and a cutting edge. The first surface may include a first corner, a first side, a first inclined surface located along the first side, and a second inclined surface located along the second side. In a plan view of the first surface, a width of the first inclined surface in a direction orthogonal to the first side may become larger as approaching the second side. A width of the second inclined surface in a direction orthogonal to the second side may become larger as approaching the first side.

17 Claims, 18 Drawing Sheets

(56) References Cited

U.S. PATENT DOCUMENTS

2017/0157685 A1\* 6/2017 Mao .................. B23C 5/109
2017/0291231 A1\* 10/2017 Mao .................. B23C 5/109
2019/0030629 A1\* 1/2019 Vlcek ................ B23C 5/2221

FOREIGN PATENT DOCUMENTS

WO        2011037186 A1    2/2013
WO   WO-2015199031 A1 \* 12/2015 ........... B23C 5/2213

\* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/027739 filed on Jul. 24, 2018, which claims priority to Japanese Application No. 2017-145719 filed on Jul. 27, 2017, which is entirely incorporated herein by reference.

TECHNICAL FIELD

The present disclosure generally relates to a cutting insert, a cutting tool and a method for manufacturing a machined product, which may be used in a cutting process of a workpiece. More specifically, the present disclosure may relate to a cutting tool for use in a milling process.

BACKGROUND

As a cutting insert used in a cutting process of a workpiece such as metal, for example, a cutting insert is discussed in Japanese Unexamined Patent Publication No. 2010-523352 (Patent Document 1). The cutting insert discussed in Patent Document 1 may include a main cutting edge and a sub cutting edge formed on a ridge line where an end surface intersects with a peripheral side surface. The main cutting edge may be used in a face milling operation. The sub cutting edge may be used in a down milling operation. The down milling operation may also be called a slant milling process. The end surface may include a main rake surface located along the main cutting edge and a sub rake surface located along the sub cutting edge.

SUMMARY

A cutting insert in a non-limiting embodiment may include a first surface, a second surface, a third surface and a cutting edge. The first surface may have a polygonal shape. The second surface may be located on a side opposite to the first surface. The third surface may be located between the first surface and the second surface. The cutting edge may be located on at least a part of a first ridge line where the first surface intersects with the third surface. The first surface may include a first corner, a first side, a second side, a first inclined surface and a second inclined surface. The first side and the second side may be individually extended from the first corner. The first inclined surface may be located along the first side and may have a height from the second surface which becomes larger as going away from the first side. The second inclined surface may be located along the second side and may have a height from the second surface which becomes larger as going away from the second side.

In a plan view of the first surface, a width of the first inclined surface in a direction orthogonal to the first side may become larger as approaching the second side, and a width of the second inclined surface in a direction orthogonal to the second side may become larger as approaching the first side.

DETAILED DESCRIPTION

Figure 1:
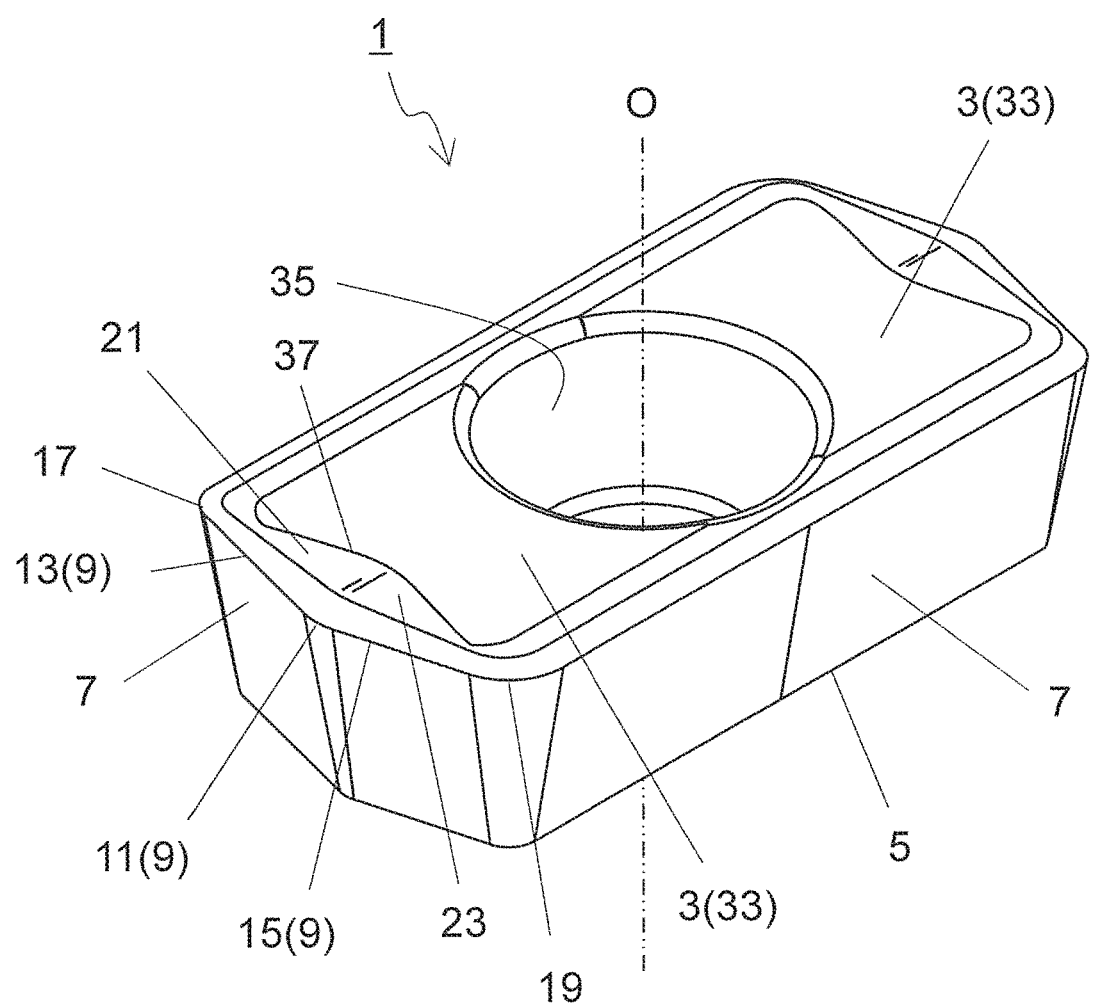
FIG. 1 is a perspective view illustrating a cutting insert in a non-limiting embodiment.

Cutting inserts 1 in non-limiting embodiments may be described in detail below with reference to the drawings. For convenience of description, the drawings referred to in the following illustrate, in simplified form, only main members necessary for describing the non-limiting embodiments. The cutting inserts may be therefore capable of including any arbitrary component not illustrated in the drawings referred to in the present disclosure. Dimensions of the members in each of the drawings may be ones which faithfully represent neither dimensions of actual structural members nor dimension ratios of these members.

<Cutting Inserts>

The cutting insert 1 (hereinafter also referred to simply as "the insert 1") in a non-limiting embodiment may include a first surface 3, a second surface 5, a third surface 7 and a cutting edge 9. The first surface 3 may have a polygonal shape and may be an upper surface as illustrated in FIG. 1. The second surface 5 may be located on opposite side of the first surface 3 and may be a lower surface as illustrated in FIG. 1. The third surface 7 may be located between the first surface 3 and the second surface 5, and may be a side surface as illustrated in FIG. 1. The cutting edge 9 may be located on at least a part of a first ridge line where the first surface 3 intersects with the third surface 7. The third surface 7 may connect to the first surface 3 and the second surface 5.

The insert 1 may have a hexagonal plate shape, and the first surface 3 and the second surface 5 individually may have a hexagonal shape in the non-limiting embodiment illustrated in FIG. 1. The shape of the insert 1 is not limited to the above configuration. There is no problem if, for example, the first surface 3 has a quadrangular, pentagonal or octagonal shape instead of a hexagonal shape.

Figure 2:
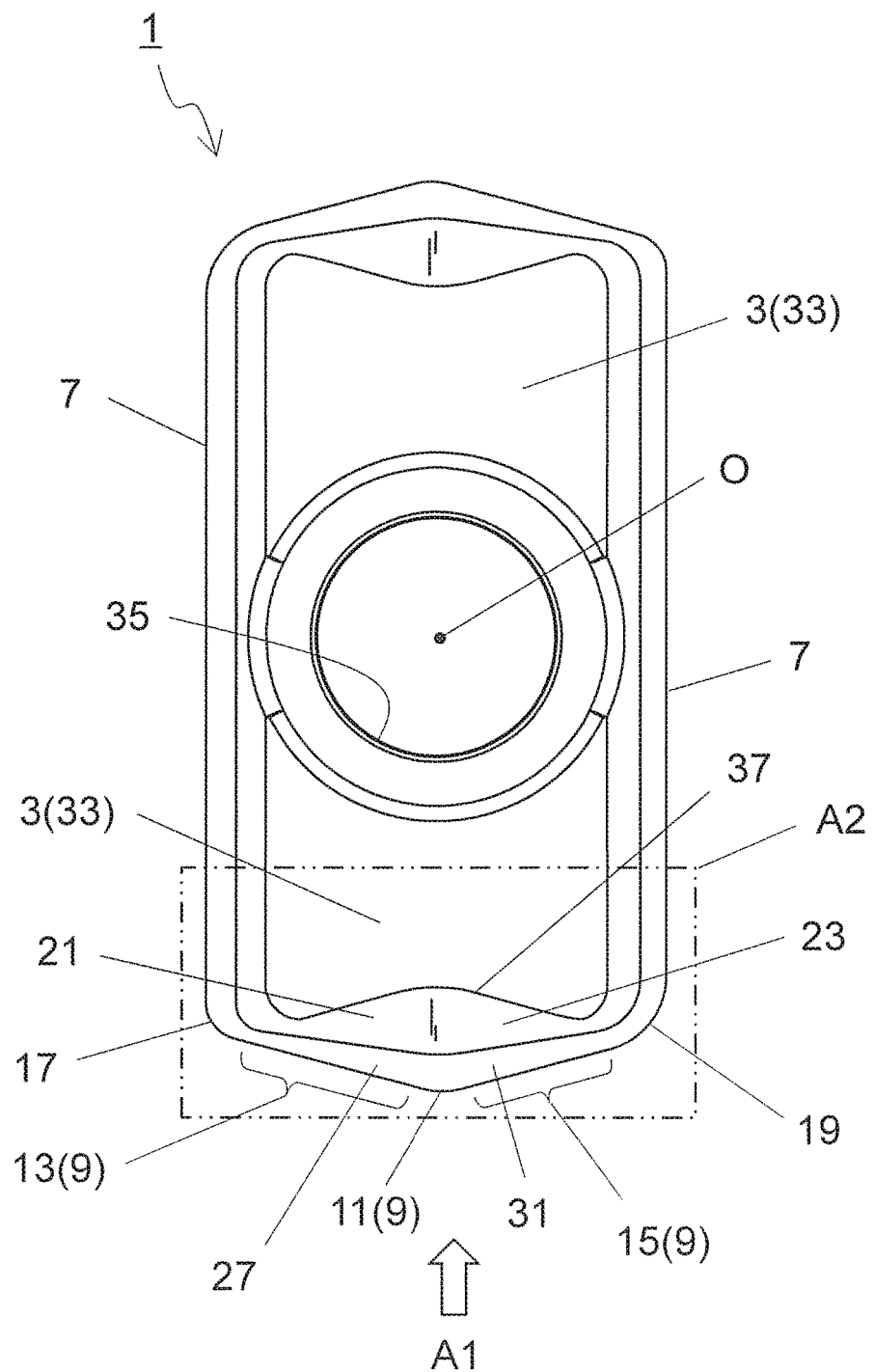
FIG. 2 is a plan view of a first surface in the cutting insert illustrated in FIG. 1.

The first surface 3 may be made in a shape having rotational symmetry of 180° on the basis of a center of the first surface 3 as in the non-limiting embodiment illustrated in FIG. 2. The center of the first surface 3 can be determined by an intersection line of diagonal lines of the first surface 3.

The first surface 3 may have an approximately polygonal shape and needs not have a strict polygonal shape. Specifically, sides of the first surface 3 having the polygonal shape need not have a strict straight line shape, but may have a convex curvilinear shape or concave curvilinear shape. Corners of the first surface 3 having the polygonal shape are not limited to a structure formed by intersection of two straight lines, but may be, for example, an outwardly rounded shape. In other words, the corners of the first surface 3 may have a convex curvilinear shape in a plan view of the first surface 3.

The term "plan view of the first surface 3" denotes that the first surface 3 is viewed from a direction orthogonal to the first surface 3 if the first surface 3 has a flat surface shape, and that the first surface 3 is viewed from a direction along a central axis of the insert 1 if the first surface 3 has no flat surface shape. The term "central axis of the insert 1" denotes an imaginary straight line passing through the center of the first surface 3 and a center of the second surface 5.

Figure 3:
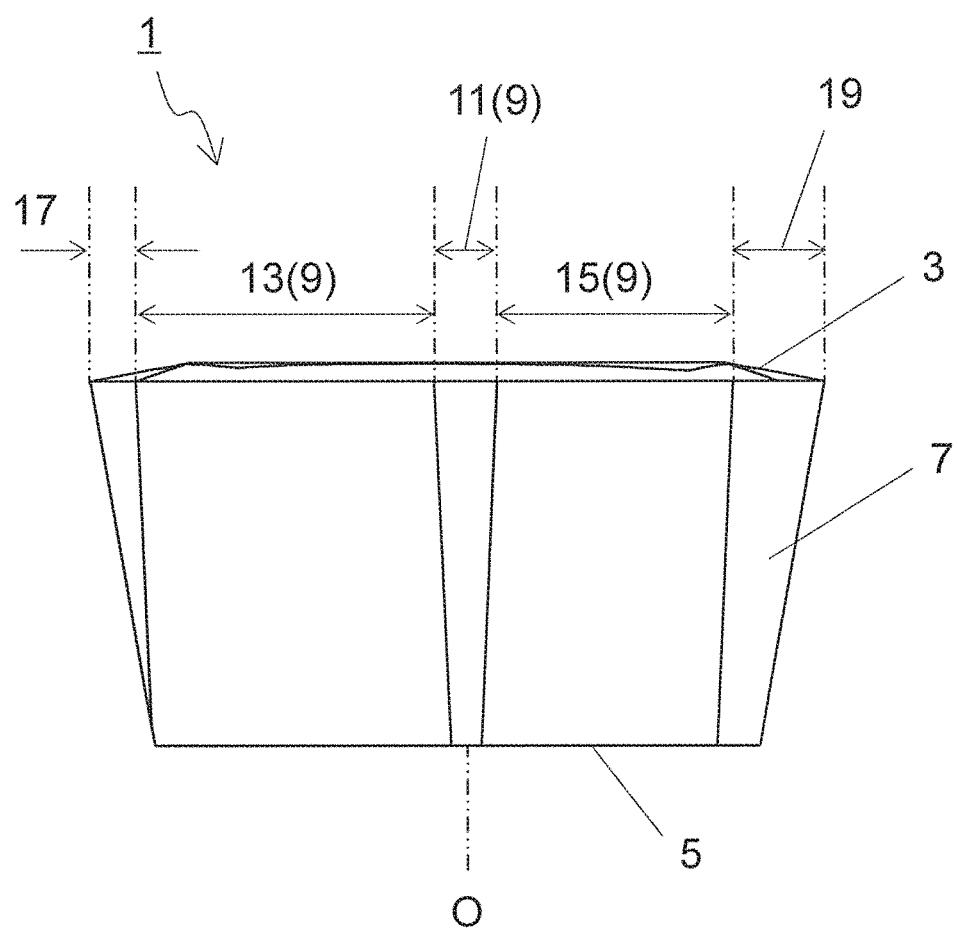
FIG. 3 is a side view of the cutting insert illustrated in FIG. 2 as viewed from A1 direction.

The second surface 5 may have the same shape as the first surface 3. Similarly to the first surface 3, the second surface 5 may have a hexagonal shape in the non-limiting embodiment illustrated in FIG. 1. In this case, the second surface 5 may have a shape slightly smaller than the first surface 3. If the second surface 5 has the above configuration, the third surface 7 may be inclined so as to approach the central axis of the insert 1 as going from an end portion on a side that connects to the first surface 3 toward an end portion on a side that connects to the second surface 5 as illustrated in FIG. 3. If the third surface 7 is inclined as described above, the insert 1 may have a so-called positive shape.

The insert 1 is, however, not limited to the positive shape, but may have a so-called negative shape. That is, the third surface 7 may be parallel to the central axis of the insert 1.

Dimensions of the insert 1 are not particularly limited. For example, a maximum width of the first surface 3 may be set to approximately 3-20 mm, and a height from the first surface 3 to the second surface 5 may be set to approximately 5-20 mm.

The first surface 3 may have a hexagonal shape and may include six corners and six sides in the non-limiting embodiment illustrated in FIG. 2. The first surface 3 may include a first corner 11 as one of the six corners. The first surface 3 may also include a first side 13 and a second side 15, each extended from the first corner 11. The first surface 3 may include a second corner 17 and a third corner 19. The second corner 17 may be adjacent to the first corner 11 with the first side 13 interposed therebetween, and the third corner 19 may be adjacent to the first corner 11 with the second side 15 interposed therebetween in the non-limiting embodiment illustrated in FIG. 2.

Figure 4:
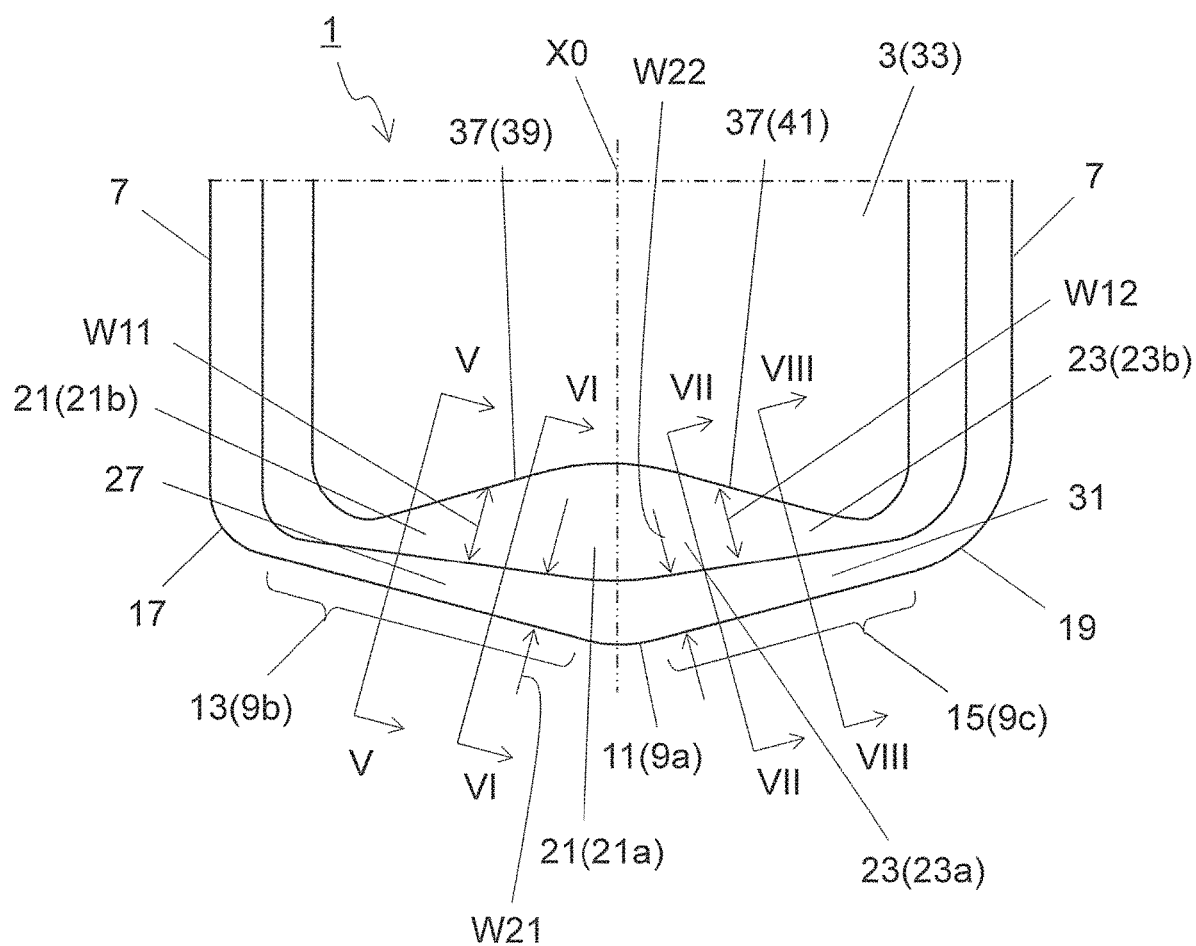
FIG. 4 is an enlarged view of a region A2 illustrated in FIG. 2.

The cutting edge 9 may be located on at least the first corner 11, a part of the first side 13 and a part of the second side 15 in the non-limiting embodiment illustrated in FIG. 4. A part of the cutting edge 9 located on the first corner 11 may be referred to as a corner cutting edge 9a, a part of the cutting edge 9 located on the first side 13 may be referred to as a first cutting edge 9b, and a part of the cutting edge 9 located on the second side 15 may be referred to as a second cutting edge 9c.

The corner cutting edge 9a out of the cutting edge 9 may be used as a bottom cutting edge. The first cutting edge 9b out of the cutting edge 9 may be used as an inner peripheral cutting edge. The second cutting edge 9c may be used as an outer peripheral cutting edge. Therefore, the first cutting edge 9b may be used mainly in a slant milling process. The second cutting edge 9c may be used mainly in a face milling process.

The first surface 3 may include a first inclined surface 21 which is located along the first side 13 and may have a larger height from the second surface 5 as going away from the first side 13. The first inclined surface 21 may be used for controlling a flow direction of chips that are generated by the first cutting edge 9b and flow across the first surface 3. Alternatively, the chips may be curled by being brought into contact with the first inclined surface 21.

The first surface 3 may further include a second inclined surface 23 which is located along the second side 15 and may have a larger height from the second surface 5 as going away from the second side 15. The second inclined surface 23 may be used for controlling a flow direction of chips that are generated by the second cutting edge 9c and flow across the first surface 3.

A width W11 of the first inclined surface 21 in a direction orthogonal to the first side 13 may increase as approaching the second side 15 in the plan view of the first surface 3. A width W12 of the second inclined surface 23 in a direction orthogonal to the second side 15 may increase as approaching the first side 13 in the plan view of the first surface 3.

In cases where the slant milling process is carried out by using the first cutting edge 9b as the inner peripheral cutting edge, chips generated by the first cutting edge 9b may tend to flow toward an outer peripheral side in a cutting tool. The chips generated by the first cutting edge 9b may extend long depending on a milling amount in the slant milling process. Consequently, a machined surface of a workpiece is liable to be damaged by the chips, and the chips are liable to wind around the cutting tool and damage the cutting tool.

However, in cases where the width W11 of the first inclined surface 21 in the direction orthogonal to the first side 13 becomes larger as approaching the second side 15 in the plan view of the first surface 3, the chips generated by the first cutting edge 9b may tend to be cut short. This may be because the chips generated by the first cutting edge 9b are more liable to be curled gently in a region in the first inclined surface 21 which is located near the second side 15 than a region located away from the second side 15.

In the above case, a flow direction of chips flowing across the first inclined surface 21 in the plan view of the first surface 3 may tend to correspond to a direction away from the second side 15 relative to an imaginary line orthogonal to the first side 13. Accordingly, if the first cutting edge 9b is used in, for example, the slant milling process, the chips generated by the first cutting edge 9b may be less likely to flow toward the outer peripheral side in the cutting tool. The chips generated by the first cutting edge 9b may also tend to be curled conically, and hence the chips may tend to be divided short.

In cases where the width W12 of the second inclined surface 23 in a direction orthogonal to the second side 15 becomes larger as approaching the first side 13 in the plan view of the first surface 3, chips generated by the second cutting edge 9c may be more likely to be gently curled in a region in the second inclined surface 23 which is located near the first side 13 than in a region located away from the first side 13.

A flow direction of chips flowing across the second inclined surface 23 in the plan view of the first surface 3 may tend to correspond to a direction away from the first side 13 relative to an imaginary line orthogonal to the second side 15. The chips may be therefore less likely to flow in a direction in which the chips are pushed into an insert pocket (hereinafter also referred to simply as a pocket) of a holder. This may lead to enhanced chip discharge performance.

Additionally, because the chips generated by the second cutting edge 9c may tend to flow in the direction away from the first side 13 relative to the imaginary line, it may be easy to avoid that the chips generated by the first cutting edge 9b forcibly collide with the chips generated by the second cutting edge 9c. Consequently, chip clogging may be less likely to occur, thus making it easier for the chips to be stably discharged to the outside.

Figure 5:
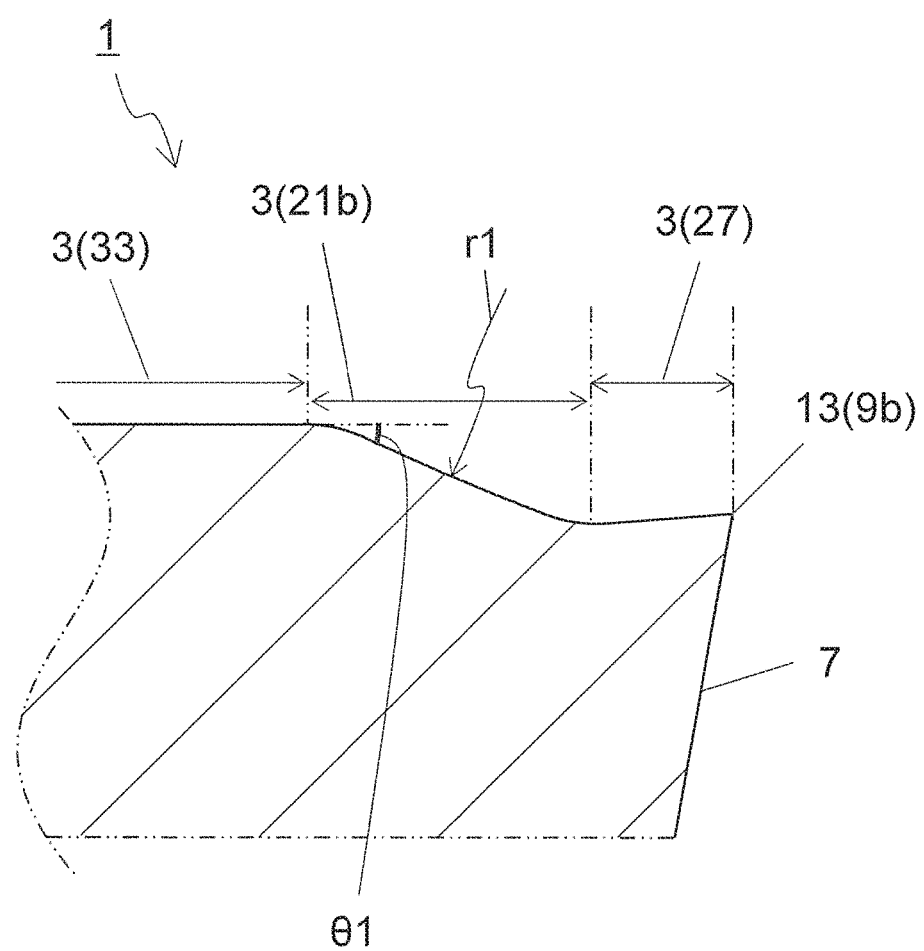
FIG. 5 is a sectional view taken along line V-V in the cutting insert illustrated in FIG. 4.

The first inclined surface 21 may have a concave curvilinear shape in a cross-section orthogonal to the first side 13, and may have a radius of curvature r1 that becomes larger in the cross-section orthogonal to the first side 13 as approaching the second side 15 in the non-limiting embodiment illustrated in FIG. 5 or the like. If the first inclined surface 21 has the above shape, chips may be more likely to be curled gently in a region of the first inclined surface 21 which is located close to the second side 15 than in a region located away from the second side 15.

Figure 6:
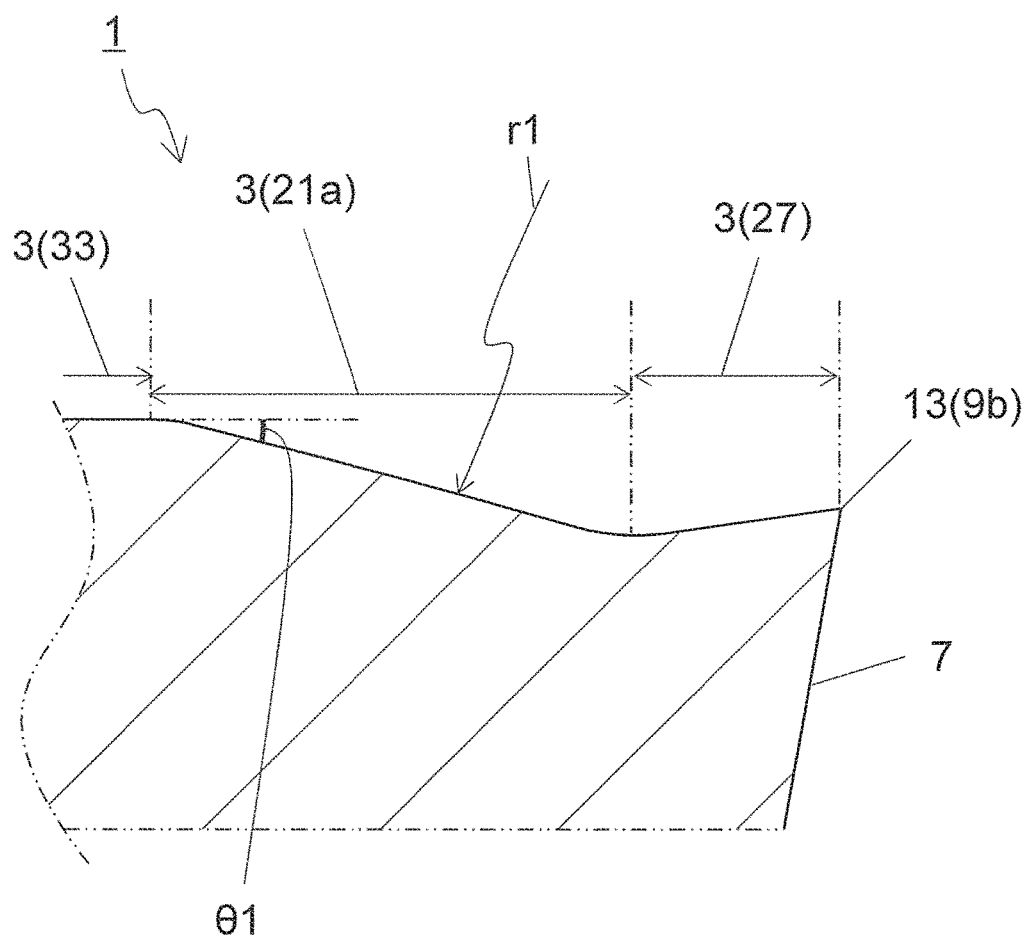
FIG. 6 is a sectional view taken along line VI-VI in the cutting insert illustrated in FIG. 4.

For example, FIG. 5 may illustrate a cross-section orthogonal to a part of the first side 13 which is located relatively far away from the second side 15. FIG. 6 may illustrate a cross-section orthogonal to a part of the first side 13 which is located relatively close to the second side 15. A radius of curvature r1 of the first inclined surface 21 in FIG. 6 may be larger than a radius of curvature r1 of the first inclined surface 21 in FIG. 5.

The non-limiting embodiment illustrated in FIG. 5 or the like may be rephrased as follows. That is, the first inclined surface 21 may include a first region 21a and a second region 21b located farther away from the second side 15 than the first region 21a in the non-limiting embodiment illustrated in FIG. 5 or the like. A cross-section that passes through the first region 21a and is orthogonal to the first side 13, and a cross section that passes through the second region 21b and is orthogonal to the first side 13 may be individually evaluated. The first inclined surface 21 may have a concave curvilinear shape in these cross-sections. A radius of curvature r1 of the first inclined surface 21 in the cross-section passing through the first region 21a may be larger than a radius of curvature r1 of the first inclined surface 21 in the cross-section passing through the second region 21b.

The first inclined surface 21 located along the first side 13 may be in contact with the first side 13 or, alternatively, may be located away from the first side 13. The first inclined surface 21 may be located away from the first side 13 in the non-limiting embodiment illustrated in FIG. 4. The first surface 3 may include a first rake surface 27 located between the first inclined surface 21 and the first side 13 in the non-limiting embodiment illustrated in FIG. 4.

The first rake surface 27 may have a larger height from the second surface 5 as going away from the first side 13. Similarly to the first inclined surface 21, the first rake surface 27 may be used for controlling the flow direction of chips that are generated by the first cutting edge 9b and pass across the first surface 3. If the height from the second surface 5 on the first rake surface 27 decreases as going away from the first side 13, the first cutting edge 9b may be subjected to a small cutting resistance during a cutting process. It may be therefore easy to control the flow direction of the chips.

A width W21 of the first rake surface 27 in a direction orthogonal to the first side 13 may be constant or changed in the plan view of the first surface 3. The width W21 may increase as approaching the second side 15 as in the non-limiting embodiment illustrated in FIG. 4. In other words, a distance between the first inclined surface 21 and the first side 13 may increase as approaching the second side 15.

If the width W21 become larger as approaching the second side 15, chips may be more likely to be curled larger and gently in a region of the first rake surface 27 which is located close to the second side 15. Consequently, chip clogging may be less likely to occur and the chips may tend to be stably discharged to the outside.

Figure 7:
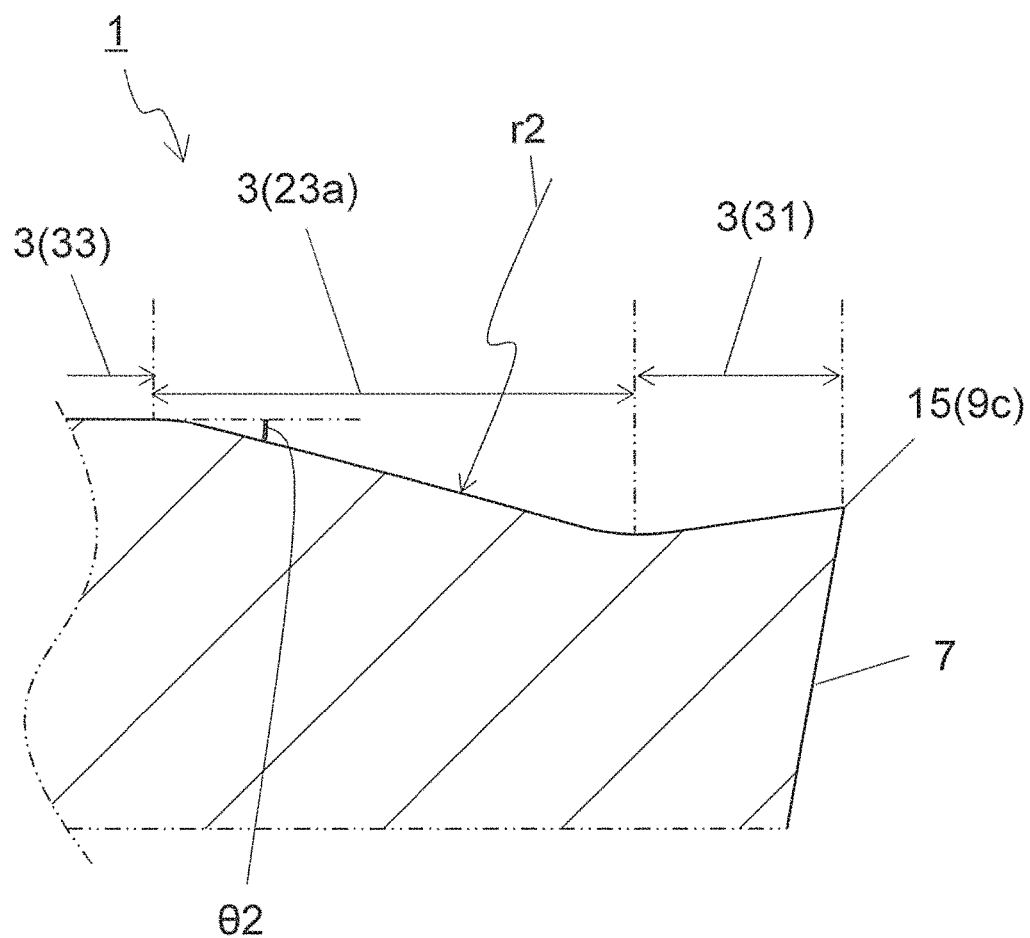
FIG. 7 is a sectional view taken along line VII-VII in the cutting insert illustrated in FIG. 4.

The second inclined surface 23 may have a concave curvilinear shape in a cross-section orthogonal to the second side 15, and may have a radius of curvature r2 that becomes larger in the cross-section orthogonal to the second side 15 as approaching the first side 13 in the non-limiting embodiment illustrated in FIG. 7 or the like. If the second inclined surface 23 has the above shape, chips may be more likely to be curled gently in a region of the second inclined surface 23 which is located close to the first side 13 than in a region located away from the first side 13.

Figure 8:
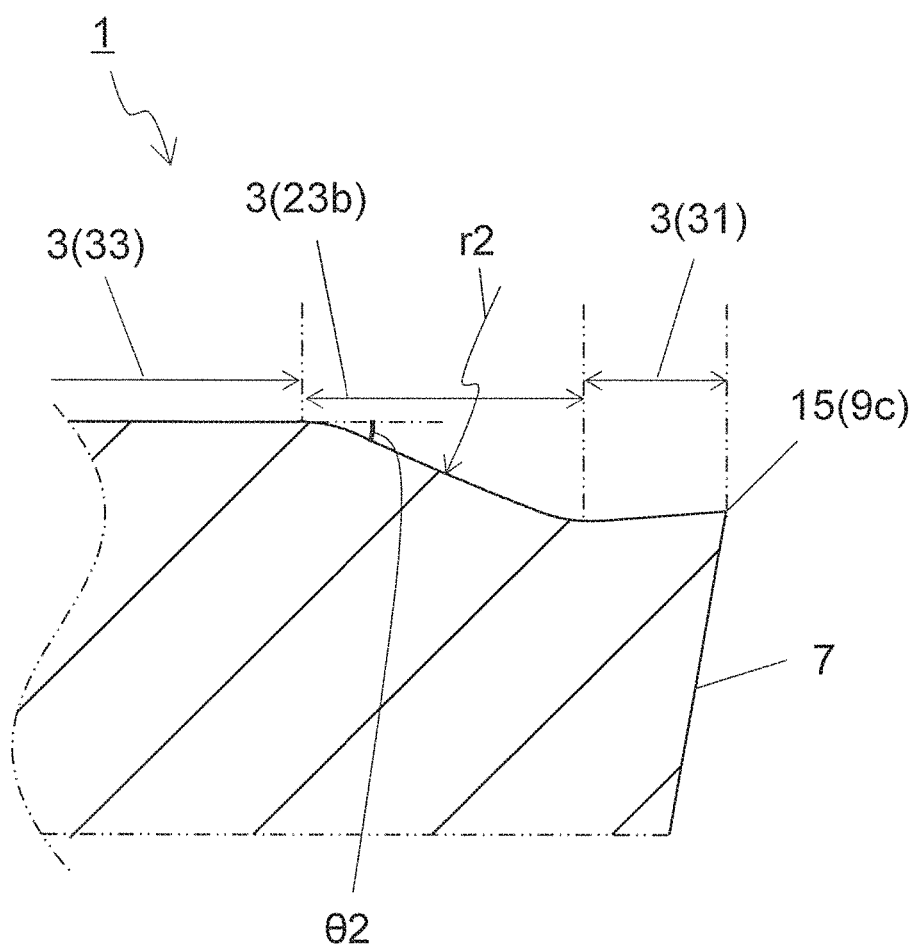
FIG. 8 is a sectional view taken along line VIII-VIII in the cutting insert illustrated in FIG. 4.

For example, FIG. 7 may illustrate a cross-section orthogonal to a part of the second side 15 which is located relatively close to the first side 13. FIG. 8 may illustrate a cross-section orthogonal to a part of the second side 15 which is located relatively far away from the first side 13. The radius of curvature r2 of the second inclined surface 23 in FIG. 7 may be larger than the radius of curvature r2 of the second inclined surface 23 in FIG. 8.

The non-limiting embodiment illustrated in FIG. 7 or the like may be rephrased as follows. That is, the second inclined surface 23 may include a third region 23a and a fourth region 23b located farther away from the first side 13 than the third region 23a in the non-limiting embodiment illustrated in FIG. 7 or the like. A cross-section that passes through the third region 23a and is orthogonal to the second side 15, and a cross section that passes through the fourth region 23b and is orthogonal to the second side 15 may be individually evaluated. The second inclined surface 23 may have a concave curvilinear shape in these cross-sections. A radius of curvature r2 of the second inclined surface 23 in the cross-section passing through the third region 23a may be larger than a radius of curvature r2 of the second inclined surface 23 in the cross-section passing through the fourth region 23b.

The second inclined surface 23 located along the second side 15 may be in contact with the second side 15 or, alternatively, may be located far away from the second side 15. The second inclined surface 23 may be located away from the second side 15 in the non-limiting embodiment illustrated in FIG. 4. The first surface 3 may include a second rake surface 31 located between the second inclined surface 23 and the second side 15 in the non-limiting embodiment illustrated in FIG. 4.

The second rake surface 31 may have a smaller height from the second surface 5 as going away from the second side 15. Similarly to the second inclined surface 23, the second rake surface 31 may be used for controlling a flow direction of chips that are generated by the second cutting edge 9c and pass across the first surface 3. If the height from the second surface 5 on the second rake surface 31 decreases as going away from the second side 15, the second cutting edge 9c may be subjected to a small cutting resistance during a cutting process. It may be therefore easy to control the flow direction of the chips.

A width W22 of the second rake surface 31 in a direction orthogonal to the second side 15 may be constant or changed in the plan view of the first surface 3. The width W22 may increase as approaching the first side 13 as in the non-limiting embodiment illustrated in FIG. 4. In other words, a distance between the second inclined surface 23 and the second side 15 may increase as approaching the first side 13.

If the width W22 become larger as approaching the first side 13, chips may be more likely to be curled larger and gently in a region of the second rake surface 31 which is located close to the first side 13. Consequently, chip clogging may be less likely to occur and the chips may tend to be stably discharged to the outside.

The first surface 3 may include a top surface 33 as in the non-limiting embodiment illustrated in FIG. 2. The top surface 33 in the non-limiting embodiment illustrated in FIG. 2 may have a flat shape and may be located closer to a center of the first surface 3 than the first inclined surface 21.

A first angle θ1 may be an angle formed by the top surface 33 and the first inclined surface 21 in a cross-section orthogonal to the first side 13. If the first angle θ1 decreases as approaching the second side 15, chips generated by the first cutting edge 9b may tend to flow toward a side of a rear end in the cutting tool. This may be because the gently curled chips passing across a region of the first inclined surface 21 which is located close to the second side 15 may tend to pass over the first inclined surface 21 and may flow onto the top surface 33.

The top surface 33 may be located closer to the center of the first surface 3 than the second inclined surface 23 in the non-limiting embodiment illustrated in FIG. 2. A second angle θ2 may be an angle formed by the top surface 33 and the second inclined surface 23 in a cross-section orthogonal to the second side 15. If the second angle θ2 decreases as approaching the first side 13, chips generated by the second cutting edge 9c may tend to flow toward a side of the rear end in the cutting tool. This may be because the gently curled chips passing across a region of the second inclined surface 23 which is located close to the first side 13 may tend to pass over the second inclined surface 23 and may flow onto the top surface 33.

The top surface 33 may be located closer to the center of the first surface 3 than the first inclined surface 21 and the second inclined surface 23 in the non-limiting embodiment illustrated in FIG. 2. A ridge line where the first inclined surface 21 and the second inclined surface 23 intersect with the top surface 33 in the plan view of the first surface 3 may be referred to as a second ridge line 37. The second ridge line 37 may have a concave shape recessed relative to the first corner 11 in the plan view of the first surface 3. If the second ridge line 37 has the above configuration, the width W12 may tend to increase as approaching the first side 13, while the width W11 may increase as approaching the second side 15.

In cases where the insert 1 includes the second ridge line 37, the second ridge line 37 may include a first portion 39 and a second portion 41. The first portion 39 may be a part of the second ridge line 37 which is located along the first inclined surface 21. The second portion 41 may be a part of the second ridge line 37 which is located along the second inclined surface 23.

Figure 9:
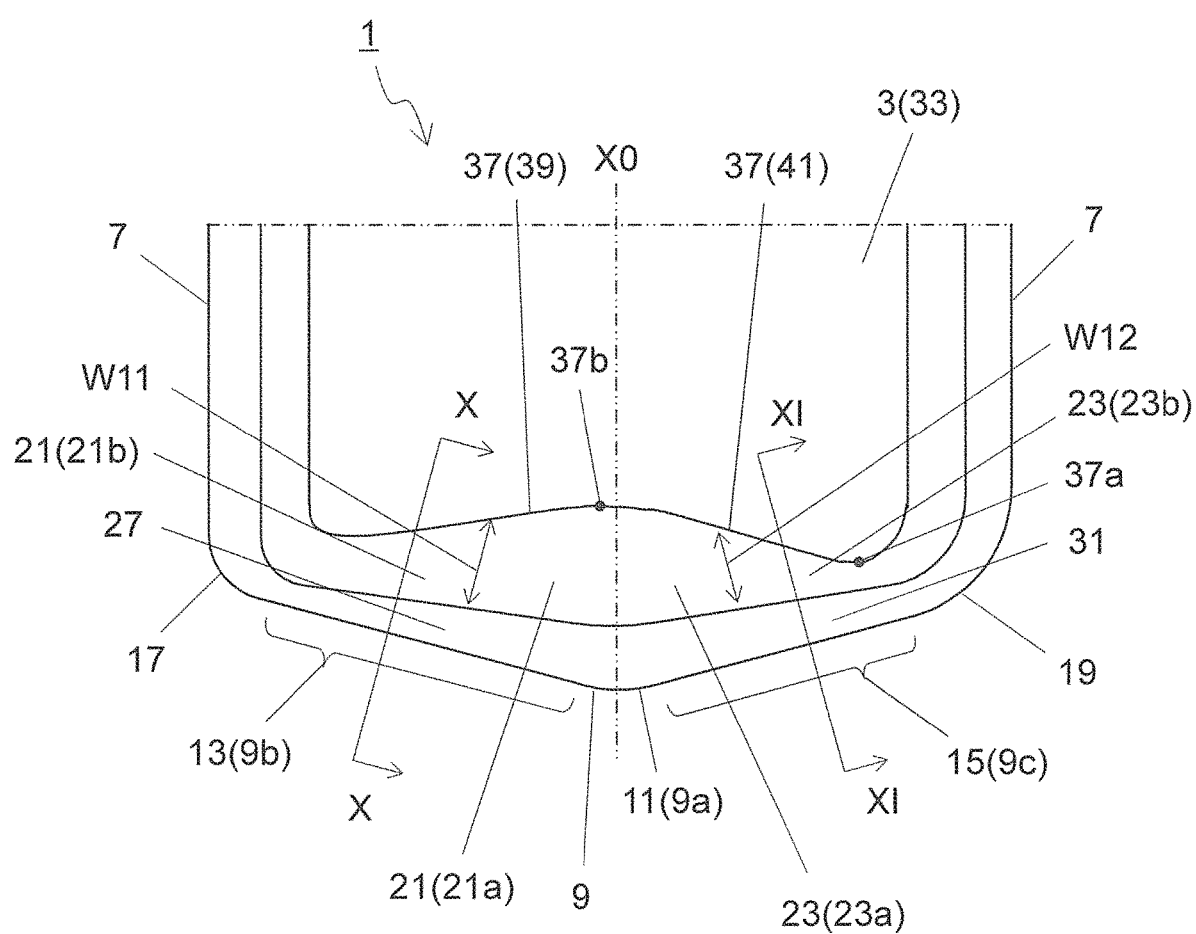
FIG. 9 is an enlarged view of a region in a cutting insert corresponding to FIG. 4 in a non-limiting embodiment.

The second ridge line 37 may include a first end portion 37a located closest to the first corner 11 in a direction along a bisector in the plan view of the first surface 3 as in the non-limiting embodiment illustrated in FIG. 9. The second ridge line 37 may also include a second end portion 37b located farthest from the first corner 11 in the direction along the bisector in the plan view of the first surface 3 as in the non-limiting embodiment illustrated in FIG. 9.

The first end portion 37a may be located at the second portion 41. In cases where the first cutting edge 9b is used mainly in the slant milling process and the second cutting edge 9c is used mainly in the face milling process, thicknesses of chips generated by the second cutting edge 9c may tend to become larger than thicknesses of chips generated by the first cutting edge 9b. If the chips have a large thickness, the chips may tend to extend long.

In this case, if the first end portion 37a is located at the second portion 41, a part of the second inclined surface 23 which is in contact with the first end portion 37a may tend to have a large inclination angle. The chips may be therefore likely to be stably curled on the second inclined surface 23. Hence, it may be easy to avoid that the chips extend too long.

The second end portion 37b may be located at the first portion 39. In cases where the first cutting edge 9b is used mainly in the slant milling process and the second cutting edge 9c is used mainly in the face milling process, thicknesses of chips generated by the first cutting edge 9b may tend to become smaller than thicknesses of chips generated by the second cutting edge 9c. If the chips have a small thickness, a chip flow may tend to become unstable.

In this case, if the second end portion 37b is located at the first portion 39, a maximum value of the width W11 of the first inclined surface 21 may tend to become larger than a maximum value of the width W12 of the second inclined surface 23. Consequently, the chips generated by the first cutting edge 9b may tend to be stably handled.

In cases where the first surface 3 includes the first inclined surface 2 and the second inclined surface 23, the first inclined surface 21 and the second inclined surface 23 may have symmetrical shapes with respect to a bisector X0 of the first corner 11 or, alternatively, may have unsymmetrical shapes with respect to the bisector X0 of the first corner 11 in the plan view of the first surface 3.

If the first inclined surface 21 and the second inclined surface 23 have approximately symmetrical shapes with respect to the bisector X0 of the first corner 11 in the plan view of the first surface 3 as illustrated in FIG. 4, it is possible to mainly use, for example, the first cutting edge 9b in the face milling process and the second cutting edge 9c in the slant milling process. That is, it is possible to use for both a right-handed cutting tool and a left-handed cutting tool. The insert 1 may be therefore excellent in economical efficiency.

As a configuration in which the first inclined surface 21 and the second inclined surface 23 have unsymmetrical shapes with respect to the bisector X0 of the first corner 11, there may be, for example, shapes as illustrated in FIGS. 9 to 12.

Figure 10:
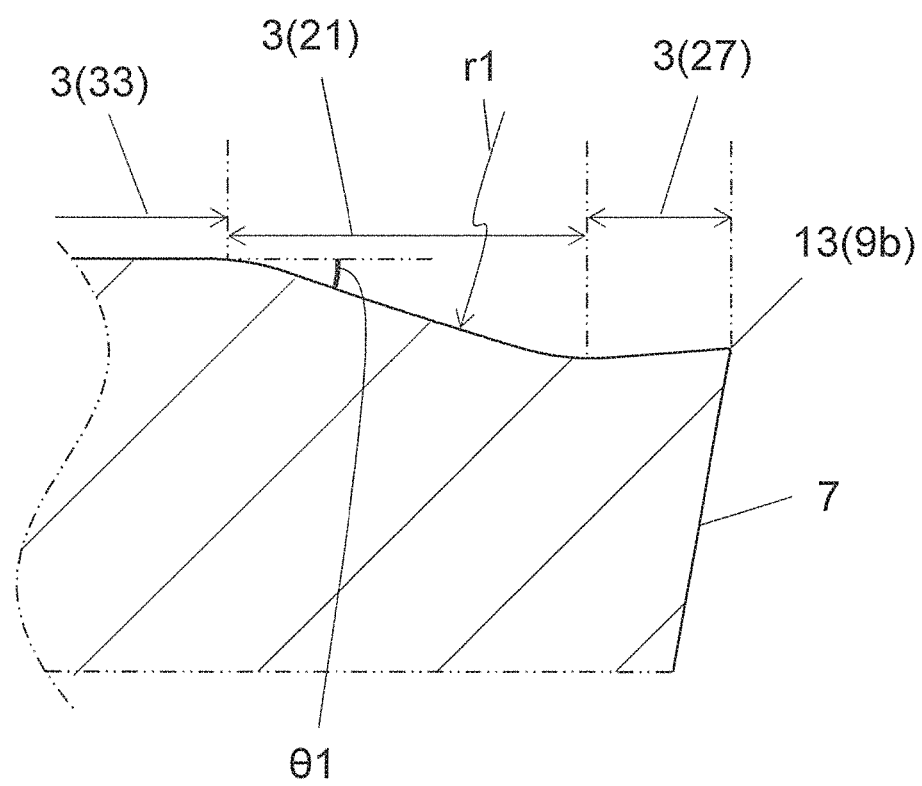
FIG. 10 is a sectional view taken along line X-X in the cutting insert illustrated in FIG. 9.
Figure 11:
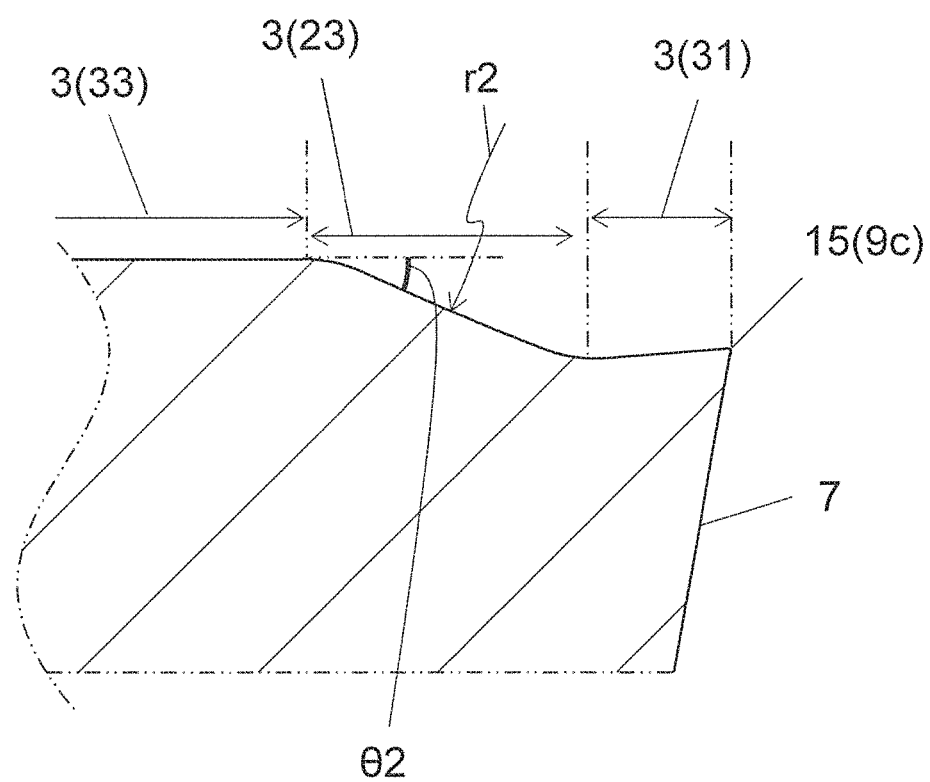
FIG. 11 is a sectional view taken along line XI-XI in the cutting insert illustrated in FIG. 9.

In the non-limiting embodiment illustrated in FIGS. 9 to 11, a maximum value of the width W11 of the first inclined surface 21 in the direction orthogonal to the first side 13 may be larger than a maximum value of the width W12 of the second inclined surface 23 in the direction orthogonal to the second side 15 in the plan view of the first surface 3. If the width W11 of the first inclined surface 21 is relatively large as described above, chips generated by the first cutting edge 9b may tend to be stably handled.

A radius of curvature r1 of the first inclined surface 21 in a cross-section orthogonal to the first side 13 may be larger than a radius of curvature r2 of the second inclined surface 23 in a cross-section orthogonal to the second side 15 in the non-limiting embodiment illustrated in FIGS. 9 to 11. In this case, chips flowing across the first inclined surface 21 in the plan view of the first surface 3 may be more likely to flow in the direction away from the second side 15 relative to an imaginary line orthogonal to the first side 13. It is therefore possible to more stably handle the chips.

A comparison between the width W11 of the first inclined surface 21 and the width W12 of the second inclined surface 23, and a comparison between the radius of curvature r1 of the first inclined surface 21 and the radius of curvature r2 of the second inclined surface 23 may be carried out by making a comparison between the width W1 or the radius of curvature r1 of the first inclined surface 21 and the width W12 or the radius of curvature r2 of the second inclined surface 23 in a cross-section in a part of the first side 13 and a cross-section in a part of the second side 15, each having the same distance to the bisector X0 of the first corner 11.

Figure 12:
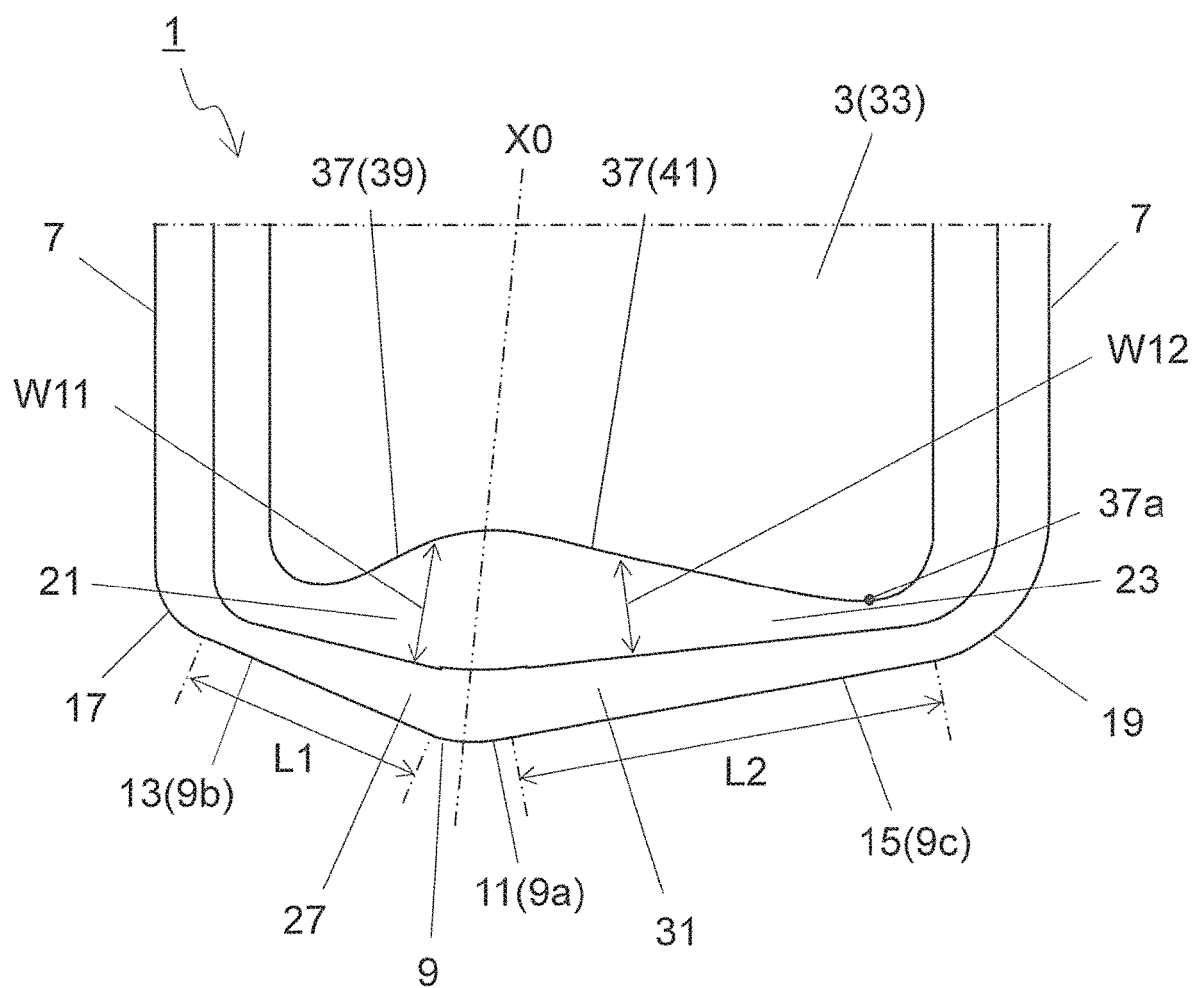
FIG. 12 is an enlarged view of a region in a cutting insert which corresponds to FIG. 4 in a non-limiting embodiment.

A length L1 of the first side 13 may be smaller than a length L2 of the second side 15 in a direction orthogonal to the bisector X0 of the first corner 11 in the plan view of the first surface 3 in the non-limiting embodiment illustrated in FIG. 12. A width W11 of the first inclined surface 21 may be smaller than a width W12 of the second inclined surface 23 in the direction orthogonal to the bisector X0 of the first corner 11 according to a ratio of the lengths L1 and L2 of the first side 13 and the second side 15 in the non-limiting embodiment illustrated in FIG. 12.

If the length L1 of the first side 13 is smaller than the length L2 of the second side 15, it is possible to ensure a large length of the second cutting edge 9c used mainly in the face milling process. This may lead to a stable cutting process.

In cases where the width W11 of the first inclined surface 21 is smaller than the width W12 of the second inclined surface 23 according to the ratio of the lengths L1 and L2 of the first side 13 and the second side 15, chips generated by the first cutting edge 9b and the second cutting edge 9c can be respectively stably curled on the first inclined surface 21 and the second inclined surface 23 even though the length L1 of the first side 13 is smaller than the length L2 of the second side 15.

The insert 1 may include a through hole 35 that opens into the first surface 3 in a non-limiting embodiment. The through hole 35 may be formed from the center of the first surface 3 toward a center of the second surface 5 as illustrated in FIG. 1. The through hole 35 may be used for fixing the insert 1 to the holder of the cutting tool. The insert 1 is fixable to the holder, for example, by inserting a screw into the through hole 35, and by screwing the insert 1.

An extending direction, namely, a penetrating direction of the through hole 35 may be orthogonal to the first surface 3 and the second surface 5 in a non-limiting embodiment. If the through hole 35 is formed from the center of the first surface 3 to the center of the second surface 5 as in the non-limiting embodiment illustrated in FIG. 2, a central axis 0 of the through hole 35 may coincide with the central axis of the insert 1, and may pass through the center of the first surface 3.

For example, cemented carbide or cermet is usable as a material of the insert 1. Examples of composition of the cemented carbide may include WC—Co, WC—TiC—Co and WC—TiC—TaC—Co. WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). However, it is not intended to limit the material of the insert 1 to the above compositions.

A surface of the insert 1 may be coated with a coating film by using a chemical vapor deposition (CVD) method or a physical vapor deposition (PVD) method. Examples of composition of the coating film may include titanium carbide (TiC), titanium nitride (TiN), titanium carbonitride (TiCN) and alumina ($Al_2O_3$).

<Cutting Tool>

Figure 13:
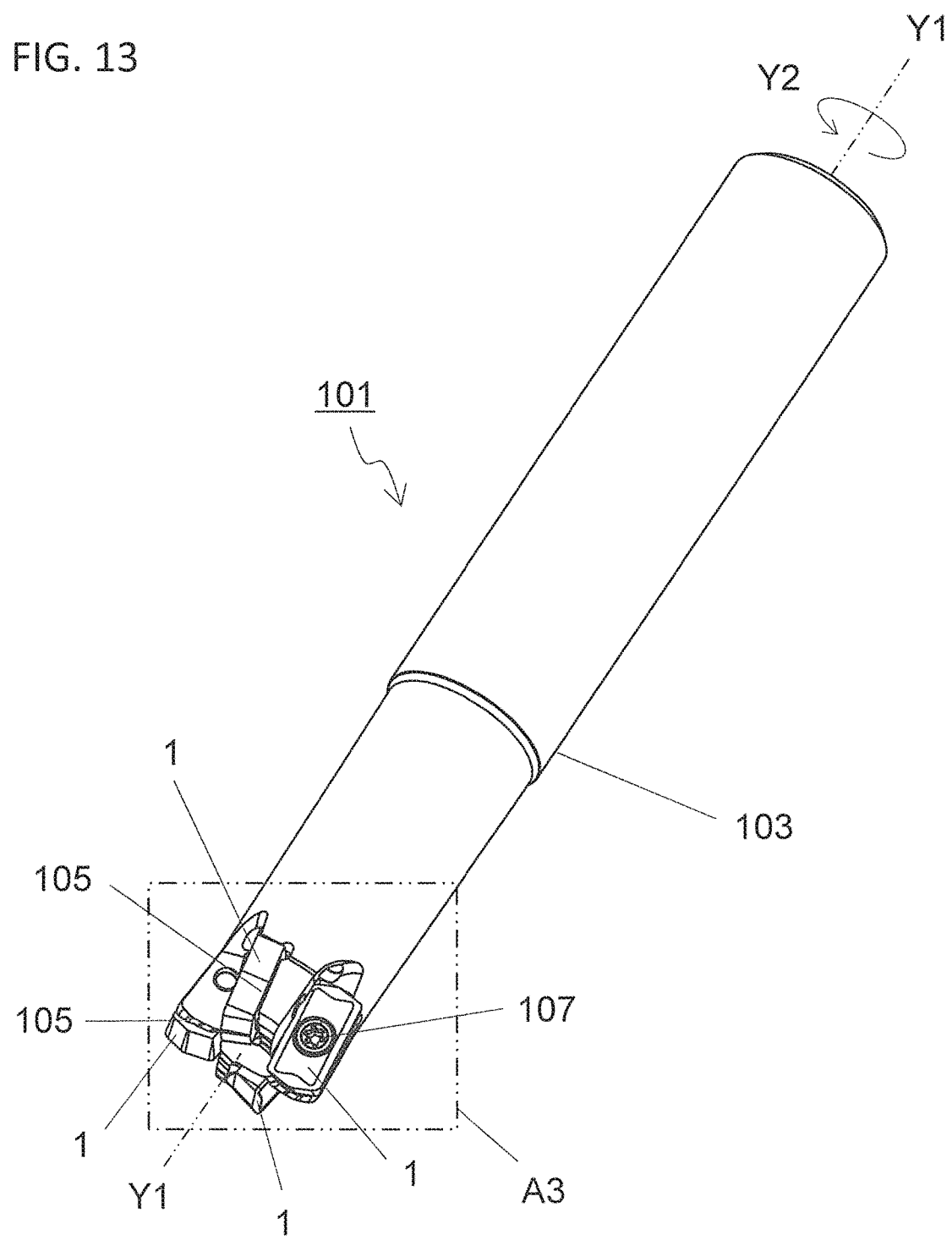
FIG. 13 is a perspective view illustrating a cutting tool in a non-limiting embodiment.
Figure 14:
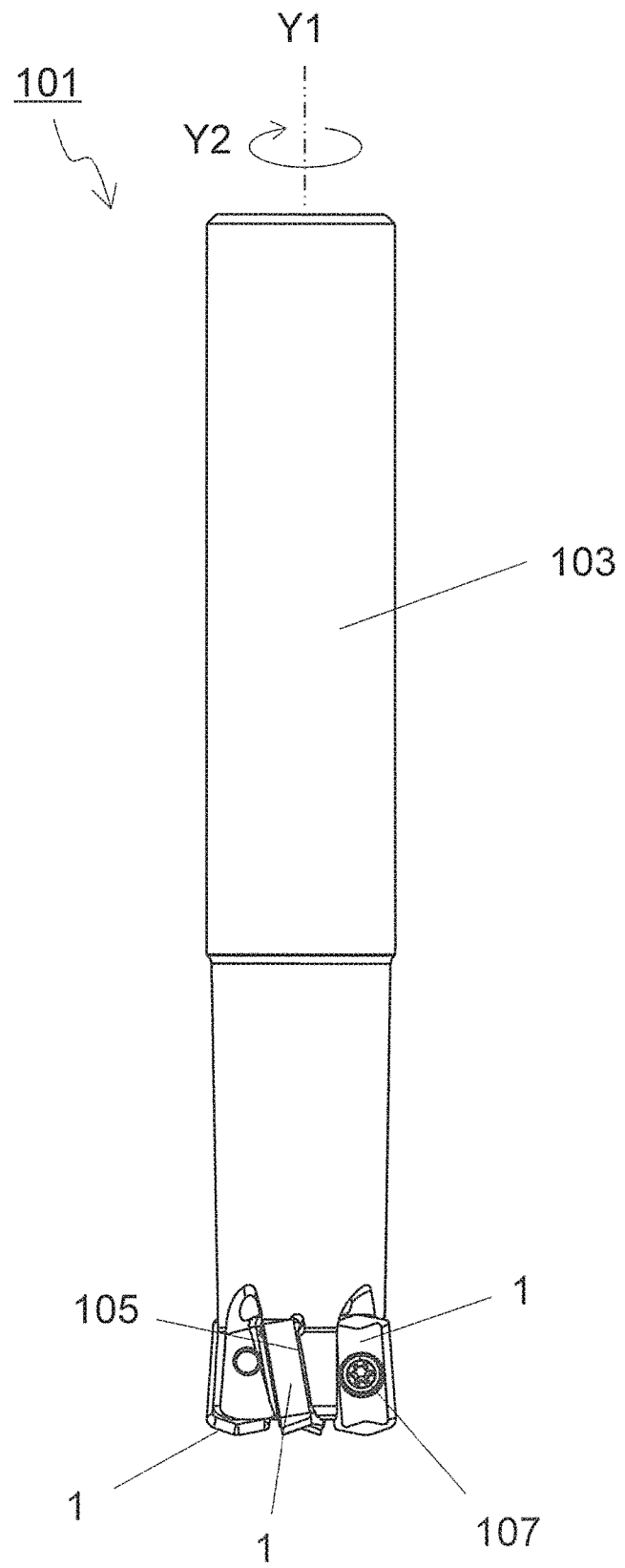
FIG. 14 is a side view of the cutting tool illustrated in FIG. 13.
Figure 15:
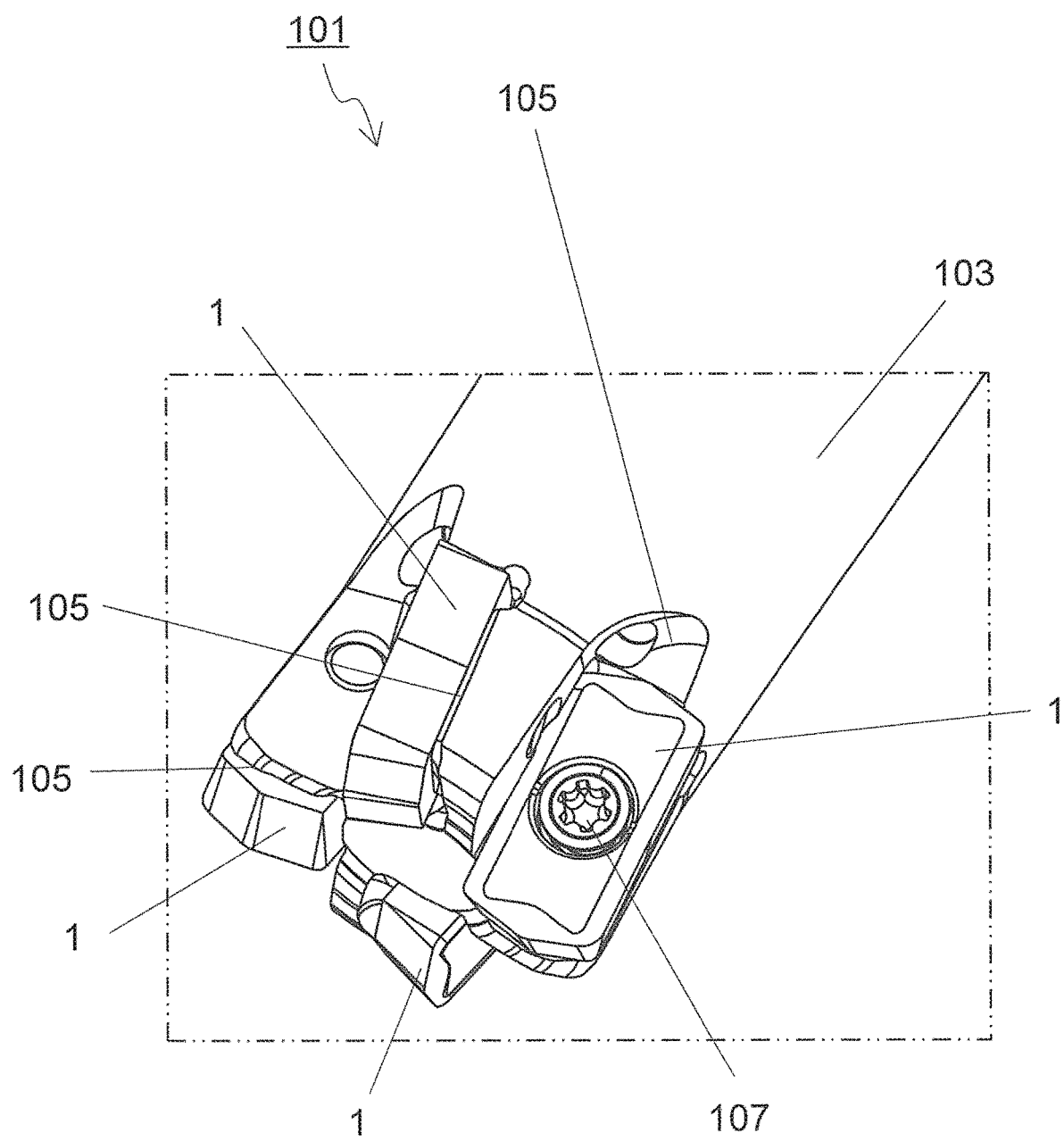
FIG. 15 is an enlarged view of a region A3 illustrated in FIG. 13.

A cutting tool 101 in a non-limiting embodiment may be described below with reference to FIGS. 13 to 15. FIGS. 13 to 15 may illustrate a state in which the insert 1 illustrated in FIG. 1 is attached to a pocket 105 of a holder 103 by a screw 107. A rotation axis Y1 of the cutting tool 101 may be indicated by a dash-dot-dot-dash line in FIG. 13 or the like.

The cutting tool 101 in a non-limiting embodiment is usable in a milling process. The cutting tool 101 may include the holder 103 having the rotation axis Y1, and may include a plurality of pockets 105 on an outer peripheral surface on a side of a front end of the holder 103, and the inserts 1 individually attached to the pockets 105.

The holder 103 may have an approximately circular columnar shape around the rotation axis Y1. A plurality of pockets 105 may be disposed on the outer peripheral surface on the side of the front end of the holder 103. The pockets 105 may be designed to permit attachment of the inserts 1, and open into the outer peripheral surface and a front end surface of the holder 103. The plurality of pockets 105 may be disposed at equal intervals or unequal intervals. The holder 103 may not be a strict circular columnar shape because the holder 103 may include the plurality of pockets 105.

The inserts 1 may be individually attached to the plurality of pockets 105 disposed in the holder 103. Each of the inserts 1 may be attached so that at least a part of the cutting edge may be protruded from the holder 103. Specifically, each of the inserts 1 may be attached to the holder 103 so that the first corner, the first side and the second side may be protruded from the holder toward a workpiece in a non-limiting embodiment.

The inserts 1 may be individually attached to the pockets 105 so that the first surface may be directed to a front side in a rotation direction Y2 of the rotation axis Y1, and also so that the third surface may be directed to a rear side in the rotation direction Y2 of the rotation axis Y1 in a non-limiting embodiment. Thus, the first surface and the second surface of the inserts 1 may not be necessarily located in a vertical direction under use environment of the cutting tool 101.

The inserts 1 may be individually attached to the pockets 105 by a screw 107. Each of the inserts 1 is attachable to the holder 103 by inserting the screw 107 into the through hole of the insert 1, and by inserting a front end of the screw 107 into a screw hole formed in the pocket 105 so as to fix the screw 107 to the screw hole. For example, steel or cast iron is usable for the holder 103. Of these materials, the steel may be particularly used from the viewpoint of enhancing toughness of the holder 103.

<Method for Manufacturing Machined Product>

Figure 16:
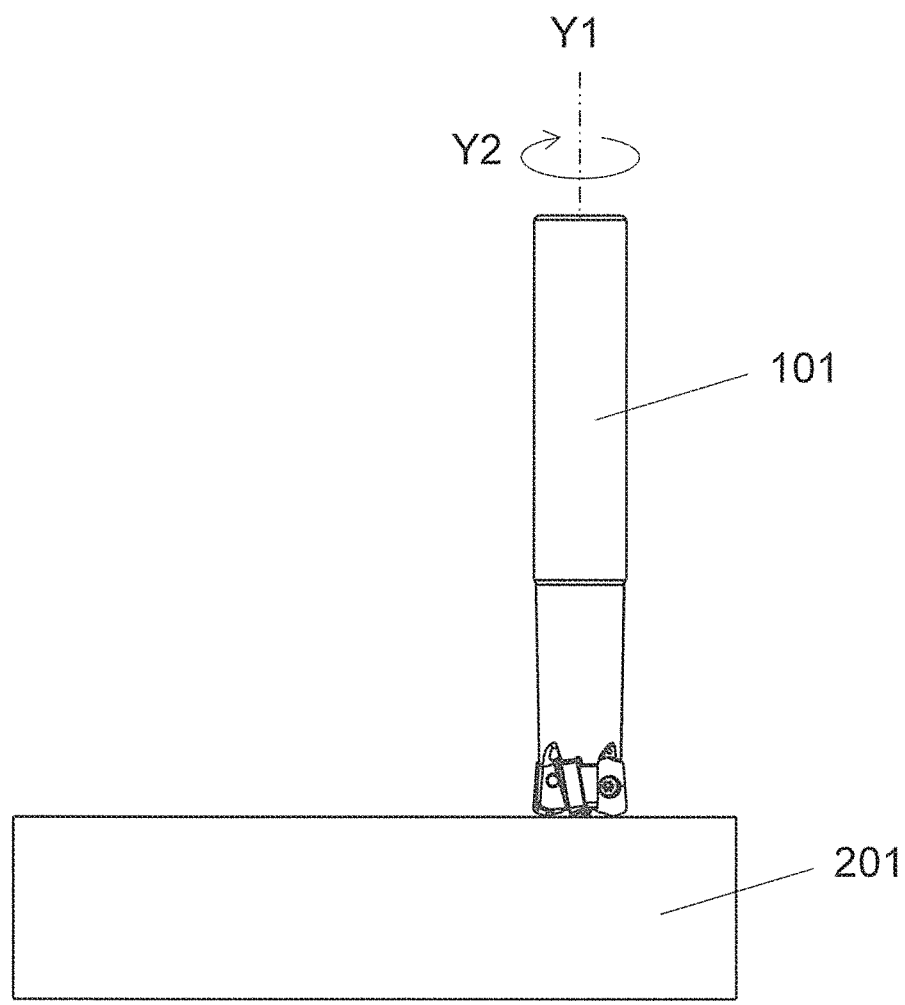
FIG. 16 is a schematic diagram illustrating one of the steps in a method for manufacturing a machined product in a non-limiting embodiment.
Figure 17:
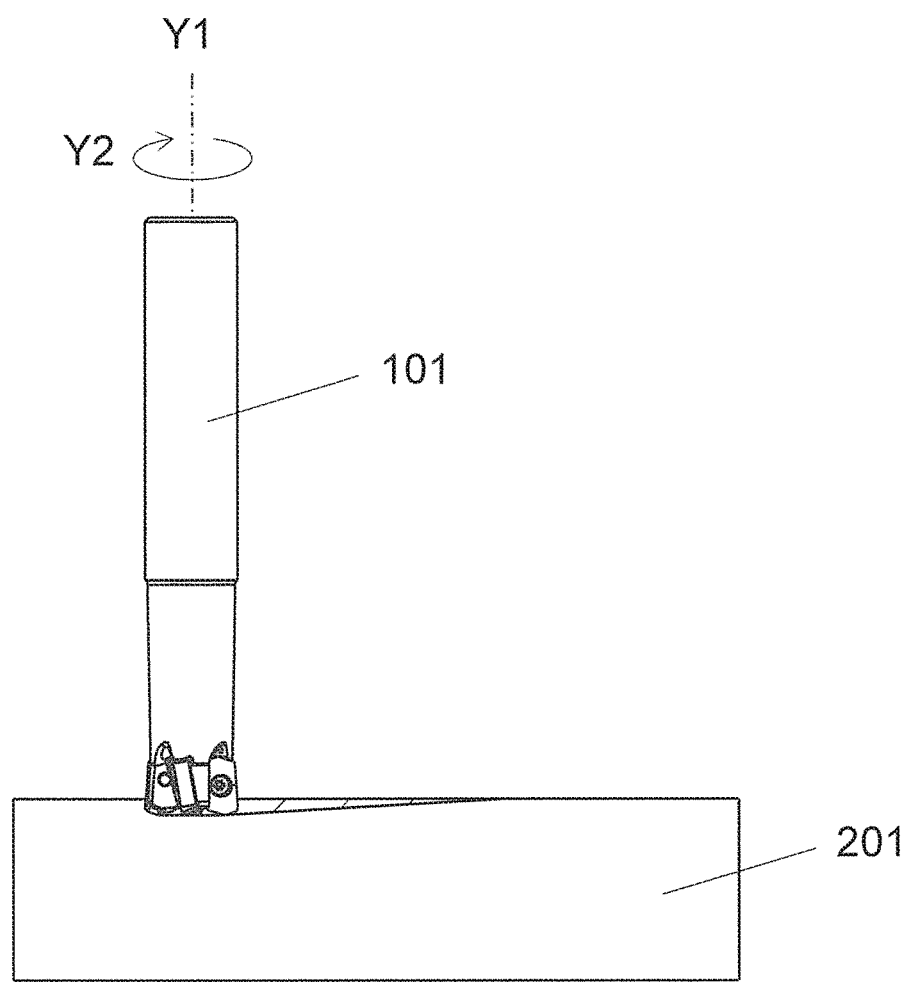
FIG. 17 is a schematic diagram illustrating one of the steps in the method for manufacturing a machined product in a non-limiting embodiment.
Figure 18:
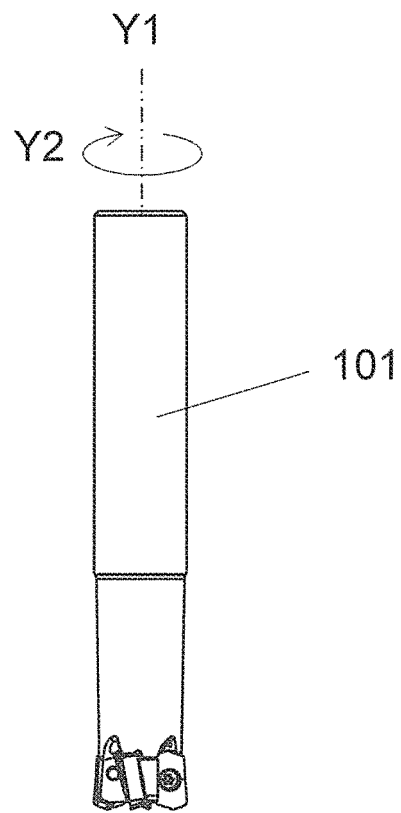
FIG. 18 is a schematic diagram illustrating one of the steps in the method for manufacturing a machined product in a non-limiting embodiment.
Figure 18:
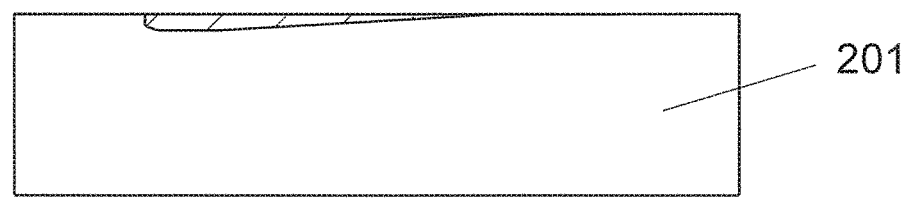

A method for manufacturing a machined product in the non-limiting embodiments may be described below with reference to FIGS. 16 to 18. FIGS. 16 to 18 may illustrate the method for manufacturing a machined product if a cutting process is carried out using the cutting tool as described above. A rotation axis Y1 of the cutting tool 101 may be indicated by a dash-dot-dot-dash line in FIGS. 16 to 18. The machined product is manufacturable by carrying out the cutting process of a workpiece 201. The manufacturing method in the non-limiting embodiments may include the following steps:

the step (1) of rotating the cutting tool 101 represented by the foregoing non-limiting embodiments;

the step (2) of bringing a cutting edge of the cutting tool 101 being rotated into contact with the workpiece 201; and the step (3) of moving the cutting tool 101 away from the workpiece 201.

More specifically, firstly, the cutting tool 101 may be relatively brought near the workpiece 201 while rotating the cutting tool 101 in Y2 direction around the rotation axis Y1 as illustrated in FIG. 16. The workpiece 201 may be then cut out by bringing the cutting edge in the cutting tool 101 into contact with the workpiece 201 as illustrated in FIG. 17. Thereafter, the cutting tool 101 may be relatively moved away from the workpiece 201 as illustrated in FIG. 18. A region of the workpiece 201 cut out by the cutting tool 101 may be marked with slant lines in FIGS. 17 and 18 in order to facilitate visual understanding.

The workpiece 201 may be fixed and the cutting tool 101 may be brought near the workpiece 201 in the above non-limiting embodiment. The workpiece 201 may be fixed and the cutting tool 101 may be rotated around the rotation axis Y1 in FIGS. 16 to 18. The workpiece 201 may be fixed and the cutting tool 101 may be moved away in FIG. 18. Although the workpiece 201 may be fixed and the cutting tool 101 may be moved in the individual steps in the cutting process using the manufacturing method in the above non-limiting embodiment, it may not be intended to limit to this non-limiting embodiment.

For example, the workpiece 201 may be brought near the cutting tool 101 in the step (1). Similarly, the workpiece 201 may be moved away from the cutting tool 101 in the step (3). If desired to continue the cutting process, the step of bringing the cutting edge in the insert 1 into contact with different portions of the workpiece 201 may be repeated while keeping the cutting tool 101 rotated.

Representative examples of material of the workpiece 201 may include carbon steel, alloy steel, stainless steel, cast iron and nonferrous metals.

DESCRIPTION OF THE REFERENCE NUMERALS

1 cutting insert (insert)
3 first surface
5 second surface
7 third surface
9 cutting edge
9*a* corner cutting edge
9*b* first cutting edge
9*c* second cutting edge
11 first corner
13 first side
15 second side
17 second corner
19 third corner
21 first inclined surface
21*a* first region
21*b* second region
23 second inclined surface
23*a* third region
23*b* fourth region
27 first rake surface
31 second rake surface
33 top surface
35 through hole
37 second ridge line
37*a* first end portion
37*b* second end portion
39 first portion
41 second portion
101 cutting tool
103 holder
105 insert pocket (pocket)
107 screw
201 workpiece

What is claimed is:

1. A cutting insert, comprising:
    a first surface having a polygonal shape;
    a second surface located on a side opposite to the first surface;
    a third surface located between the first surface and the second surface; and
    a cutting edge located on at least a part of a first ridge line where the first surface intersects with the third surface, wherein
    the first surface comprises:
        a first corner,
        a first side extended from the first corner,
        a second side extended from the first corner,
        a first inclined surface that is located along the first side and has a height from the second surface that increases going away from the first side, and
        a second inclined surface that is located along the second side and has a height from the second surface that increases going away from the second side;
    in a plan view of the first surface, a width of the first inclined surface in a direction orthogonal to the first side becomes larger approaching the second side, and a width of the second inclined surface in a direction orthogonal to the second side becomes larger approaching the first side; and
    the first inclined surface has a concave curvilinear shape in a cross-section orthogonal to the first side, and has a radius of curvature in the cross-section orthogonal to the first side that becomes larger approaching the second side.

2. The cutting insert according to claim 1, wherein
    a distance between the first inclined surface and the first side becomes larger approaching the second side in the plan view of the first surface.

3. The cutting insert according to claim 1, wherein
    the first surface comprises a top surface having a flat shape and the top surface is located closer to a center of the first surface than the first inclined surface; and
    a first angle decreases approaching the second side, wherein the first angle is an angle formed by the top surface and the first inclined surface in a cross-section orthogonal to the first side.

4. The cutting insert according to claim 1, wherein
    the second inclined surface has a concave curvilinear shape in a cross-section orthogonal to the second side, and has a radius of curvature in the cross-section orthogonal to the second side that becomes larger approaching the first side.

5. The cutting insert according to claim 1, wherein
a distance between the second inclined surface and the second side becomes larger approaching the first side in the plan view of the first surface.

6. The cutting insert according to claim 1, wherein
the first surface comprises a top surface having a flat shape and the top surface is located closer to a center of the first surface than the second inclined surface; and
a second angle decreases approaching the first side, wherein the second angle is an angle formed by the top surface and the second inclined surface in a cross-section orthogonal to the second side.

7. The cutting insert according to claim 1, wherein
the first surface comprises a top surface having a flat shape and the top surface is located closer to a center of the first surface than the first inclined surface and the second inclined surface; and
in the plan view of the first surface, a second ridge line has a concave shape recessed relative to the first corner and is located where the first inclined surface and the second inclined surface intersect with the top surface.

8. The cutting insert according to claim 7, wherein
the second ridge line comprises:
    a first portion located along the first inclined surface, and
    a second portion located along the second inclined surface;
in the plan view of the first surface, the second ridge line comprises a first end portion located closest to the first corner in a direction along a bisector of the first corner; and
the first end portion is located at the second portion.

9. The cutting insert according to claim 7, wherein
the second ridge line comprises:
    a first portion located along the first inclined surface, and
    a second portion located along the second inclined surface;
in the plan view of the first surface, the second ridge line comprises a second end portion located farthest from the first corner in a direction along a bisector of the first corner, and
the second end portion is located at the first portion.

10. A cutting tool, comprising:
a holder comprising a pocket located on a side of a front end of the holder; and
the cutting insert according to claim 1, the insert being located in the pocket.

11. A method for manufacturing a machined product, comprising:
rotating the cutting tool according to claim 10;
bringing the cutting tool being rotated into contact with a workpiece; and
moving the cutting tool away from the workpiece.

12. A cutting insert, comprising:
a first surface having a polygonal shape;
a second surface located on a side opposite to the first surface;
a third surface located between the first surface and the second surface; and
a cutting edge located on at least a part of a first ridge line where the first surface intersects with the third surface, wherein
the first surface comprises:
    a first corner,
    a first side extended from the first corner,
    a second side extended from the first corner,
    a first inclined surface that is located along the first side and has a height from the second surface that increases going away from the first side, and
    a second inclined surface that is located along the second side and has a height from the second surface that increases going away from the second side;
in a plan view of the first surface, a width of the first inclined surface in a direction orthogonal to the first side becomes larger approaching the second side, and a width of the second inclined surface in a direction orthogonal to the second side becomes larger approaching the first side;
the first surface comprises a top surface having a flat shape and the top surface is located closer to a center of the first surface than the first inclined surface; and
a first angle decreases approaching the second side, wherein the first angle is an angle formed by the top surface and the first inclined surface in a cross-section orthogonal to the first side.

13. A cutting tool, comprising:
a holder comprising a pocket located on a side of a front end of the holder; and
the cutting insert according to claim 12, the insert being located in the pocket.

14. A method for manufacturing a machined product, comprising:
rotating the cutting tool according to claim 13;
bringing the cutting tool being rotated into contact with a workpiece; and
moving the cutting tool away from the workpiece.

15. A cutting insert, comprising:
a first surface having a polygonal shape;
a second surface located on a side opposite to the first surface;
a third surface located between the first surface and the second surface; and
a cutting edge located on at least a part of a first ridge line where the first surface intersects with the third surface, wherein
the first surface comprises:
    a first corner,
    a first side extended from the first corner,
    a second side extended from the first corner,
    a first inclined surface that is located along the first side and has a height from the second surface that increases going away from the first side, and
    a second inclined surface that is located along the second side and has a height from the second surface that increases going away from the second side;
in a plan view of the first surface, a width of the first inclined surface in a direction orthogonal to the first side becomes larger approaching the second side, and a width of the second inclined surface in a direction orthogonal to the second side becomes larger approaching the first side;
the first surface comprises a top surface having a flat shape and the top surface is located closer to a center of the first surface than the first inclined surface and the second inclined surface; and
in the plan view of the first surface, a second ridge line has a concave shape recessed relative to the first corner and is located where the first inclined surface and the second inclined surface intersect with the top surface.

16. A cutting tool, comprising:
a holder comprising a pocket located on a side of a front end of the holder; and the cutting insert according to claim 15, the insert being located in the pocket.

17. A method for manufacturing a machined product, comprising:

rotating the cutting tool according to claim 16;

bringing the cutting tool being rotated into contact with a workpiece; and moving the cutting tool away from the workpiece.

* * * * *